Aug. 3, 1926.
E. L. THOMAS
1,594,430
INTERNAL COMBUSTION ENGINE
Filed Nov. 24, 1923    6 Sheets-Sheet 1
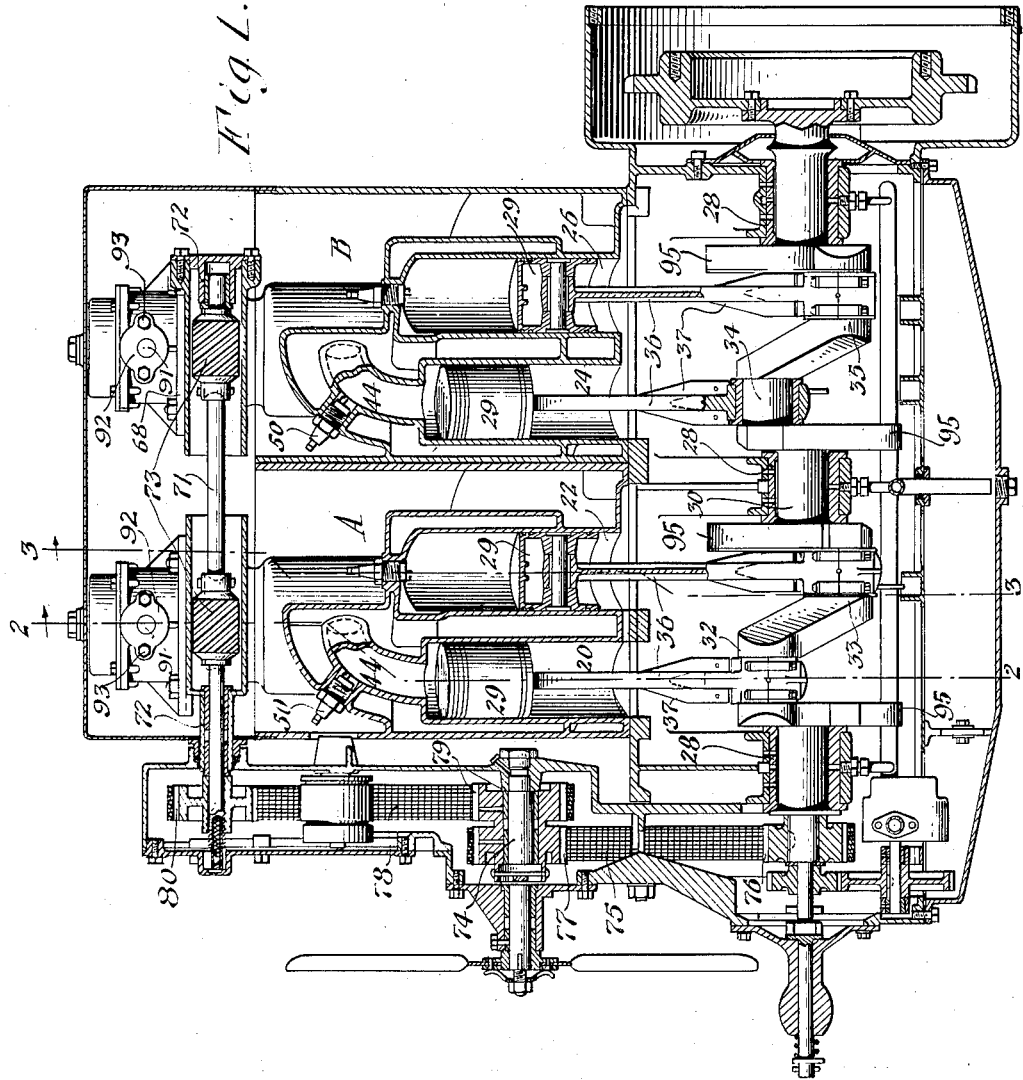

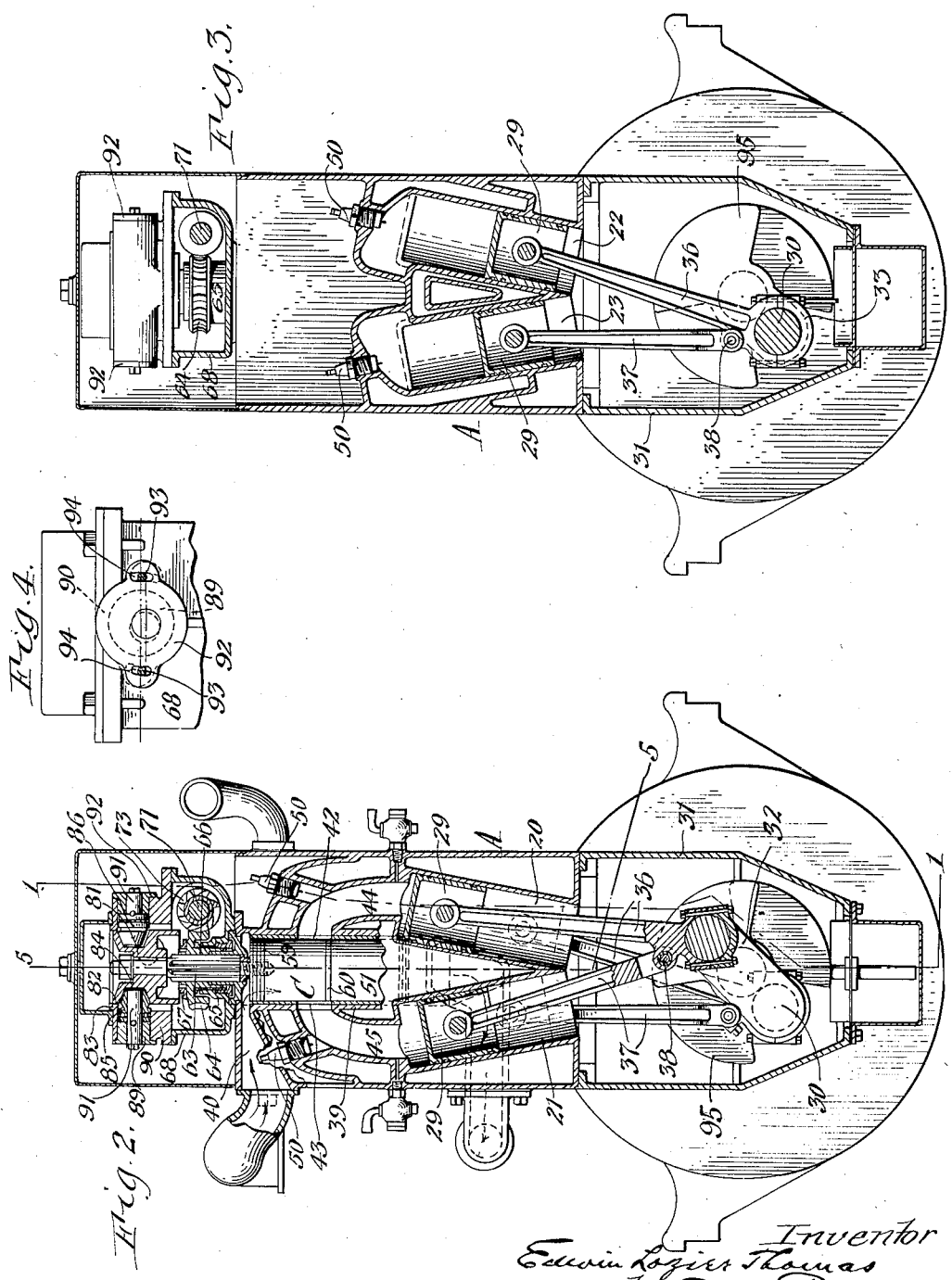

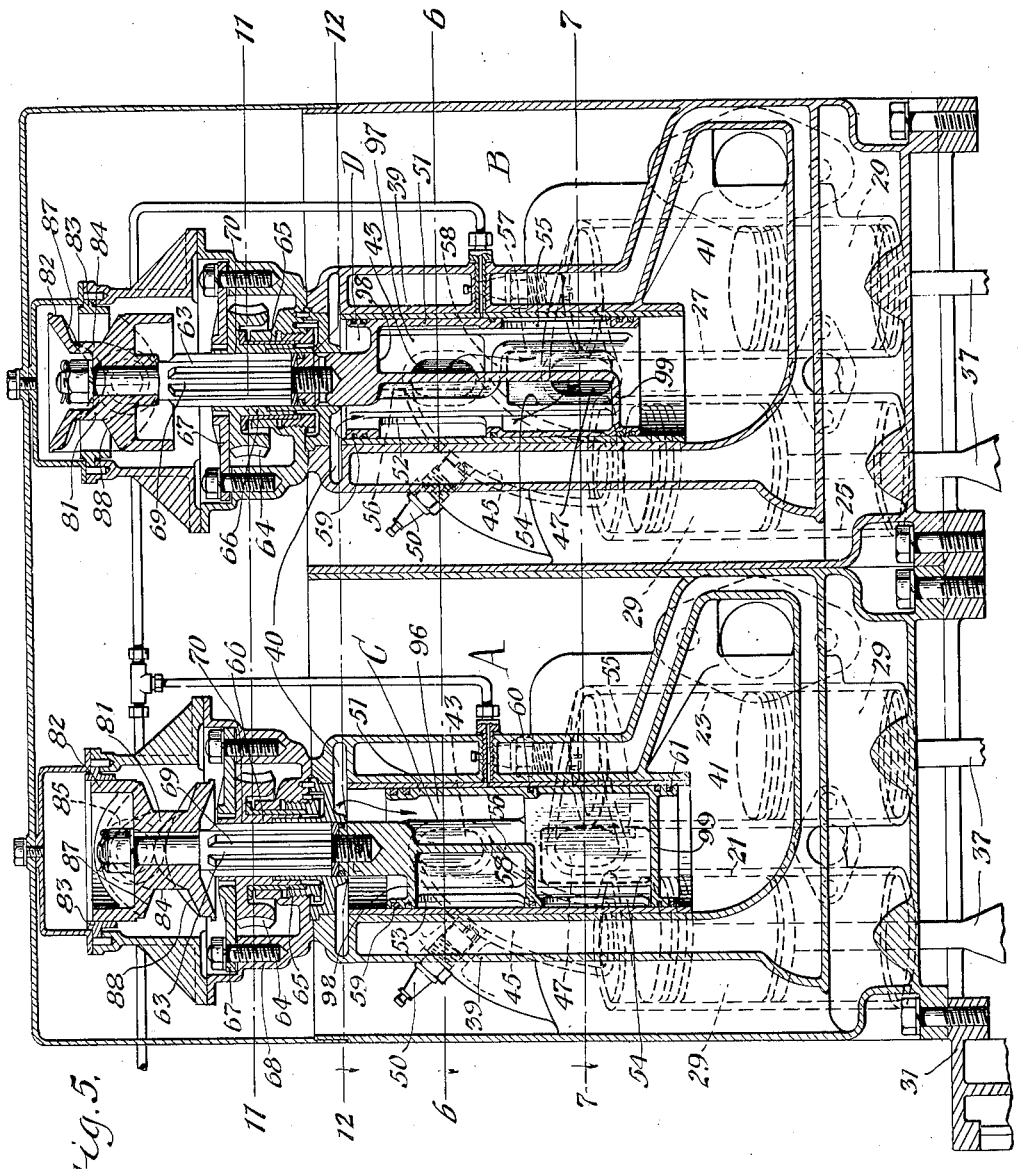

Aug. 3, 1926. 1,594,430
E. L. THOMAS
INTERNAL COMBUSTION ENGINE
Filed Nov. 24, 1923      6 Sheets-Sheet 4
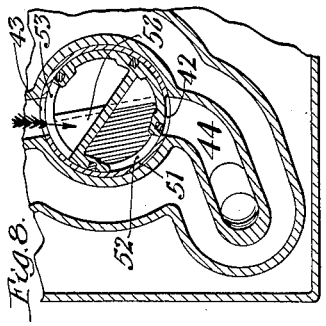
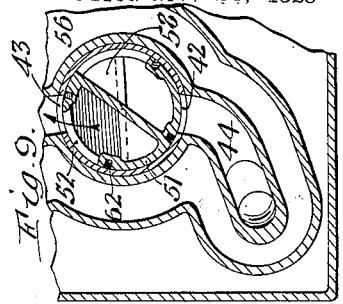
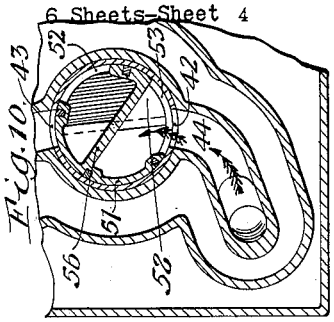
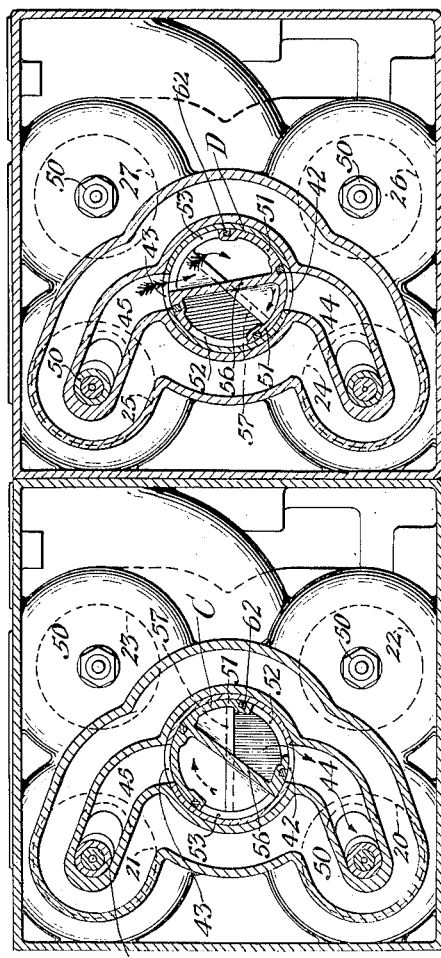
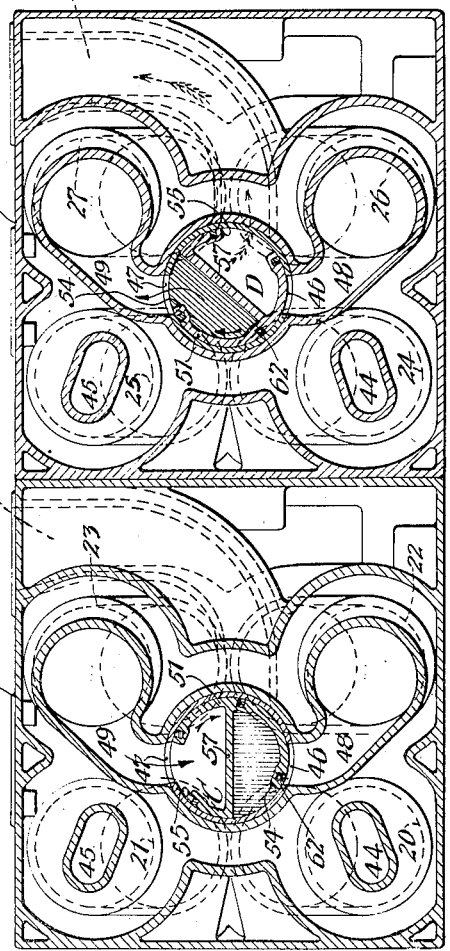
Inventor
Edwin Lozier Thomas
by Pope & Powers
Attorneys

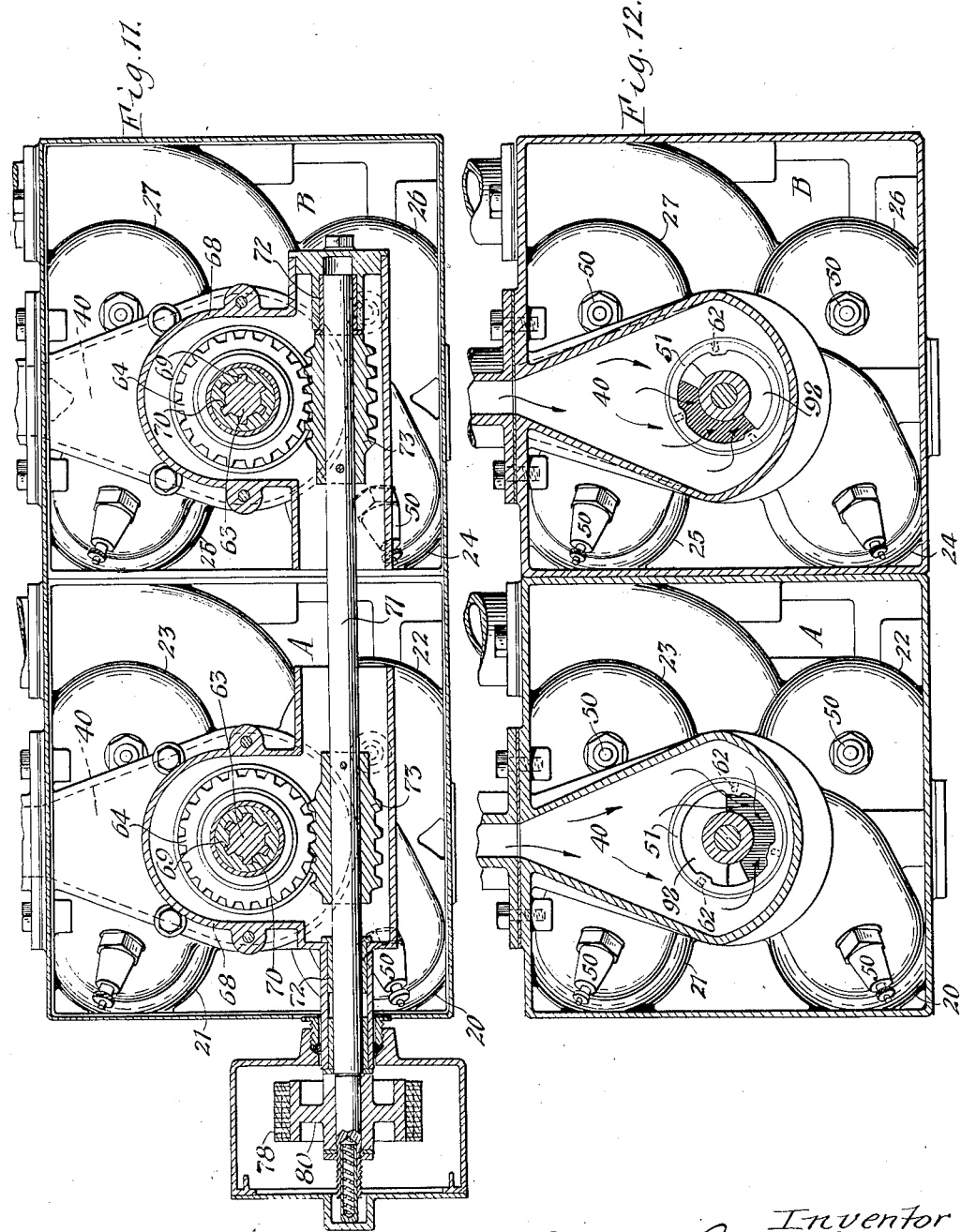

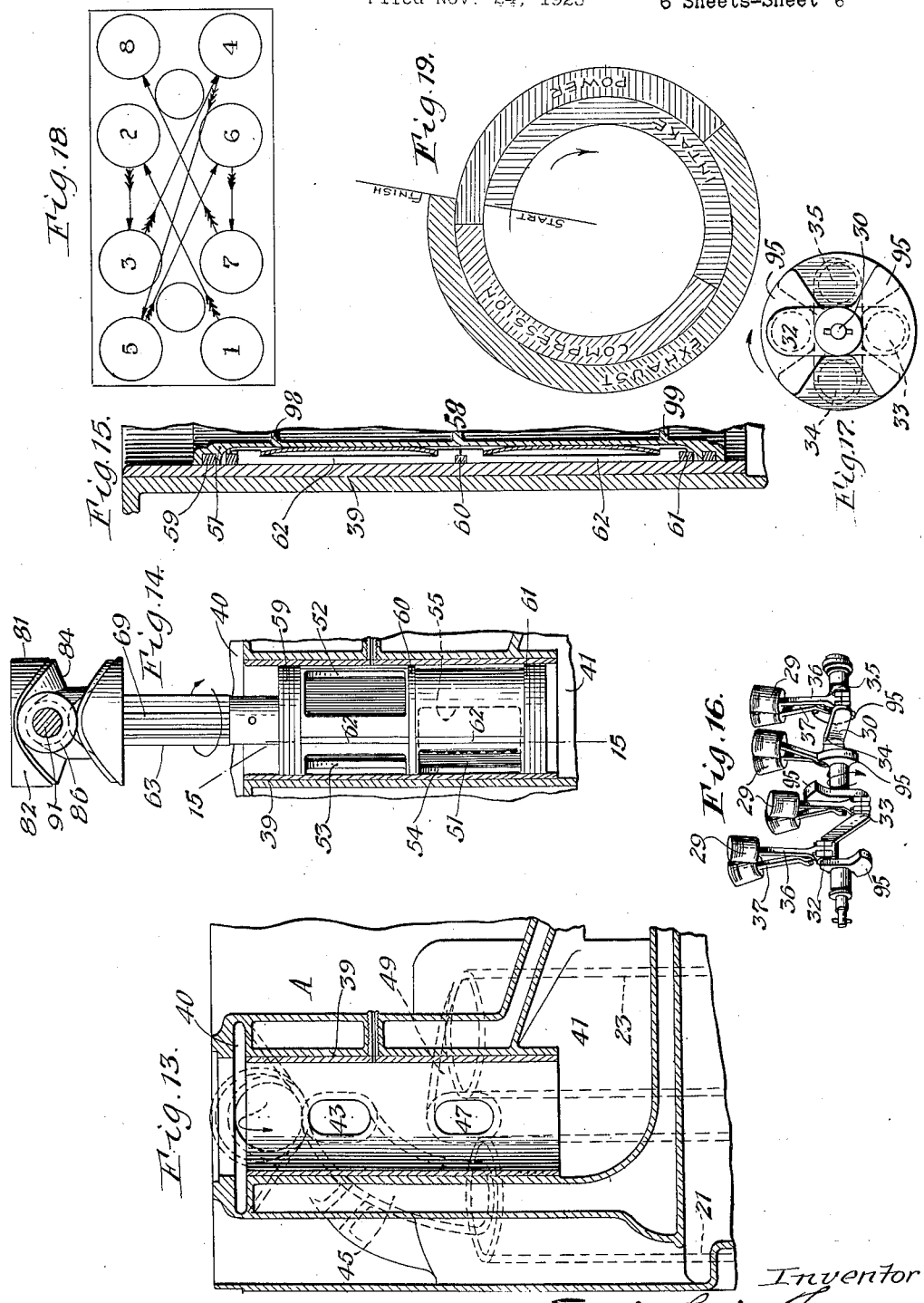

Patented Aug. 3, 1926.

1,594,430

UNITED STATES PATENT OFFICE.

EDWIN LOZIER THOMAS, OF BUFFALO, NEW YORK.

INTERNAL-COMBUSTION ENGINE.

Application filed November 24, 1923. Serial No. 676,745.

This invention relates to an internal combustion engine which is adapted to be operated by the explosion of gas, gasolene or similar fuel and it has for its objects to improve the construction of the valve mechanism and the arrangement of the cylinders so as to permit of utilizing one rotating reciprocating valve for each set of four cylinders; also to balance the free forces and moments which are set up by the angularity of the connecting rods and the reciprocating mass of the valve mechanism and the distance from the center of gravity of the engine to the center of the reciprocating mass of the valve mechanism, which balance is obtained by utilizing moments and forces of the valve mechanism.

In the accompanying drawings which represent a practical embodiment of my invention, Figure 1 is a vertical longitudinal section of an engine embodying my improvements, the section being taken substantially on line 1—1, Fig. 2. Figures 2 and 3 are vertical transverse sections taken on the correspondingly numbered lines in Figure 1. Figure 4 is a fragmentary side elevation of the upper part of the engine showing a suitable means for adjusting the position of the cam which reciprocates one of the inlet and exhaust valves. Figure 5 is a fragmentary vertical longitudinal section, on an enlarged scale, taken on line 5—5, Fig. 2. Figures 6 and 7 are horizontal sections taken on the correspondingly numbered lines in Figure 5 and showing one of the positions which the inlet and exhaust valves assume during the operation of the engine. Figures 8, 9 and 10 are fragmentary horizontal sections, corresponding to the inlet and exhaust valve at the left-hand side of Figure 6 but showing this valve in the different main positions which it assumes during the operation of the engine. Figures 11 and 12 are horizontal sections taken on the correspondingly numbered lines in Figure 5. Figure 13 is a fragmentary vertical section of one of the valve casings and adjacent parts, similar to those shown in Figure 5 but showing the valve and its operating mechanism stripped or removed from this casing for the purpose of more clearly illustrating the various passages opening into this casing. Figure 14 is a fragmentary vertical section through one of the valve casings or housings showing the combined inlet and exhaust valve mounted therein and associated with the cam whereby a longitudinally reciprocating movement is imparted to this valve. Figure 15 is a fragmentary longitudinal section, on an enlarged scale taken on line 15—15, Fig. 14 of one of the valve casings and a part of an inlet and exhaust valve mounted therein. Figure 16 is a perspective view showing the manner of assembling the crank shaft with the several power pistons of the engine. Figure 17 is an end view of the main or crank shaft, on an enlarged scale. Figure 18 is a diagrammatic view showing the firing order of the several cylinders of the engine. Figure 19 is a diagram illustrating the timing of this engine relative to the length of the intake, compression, power and exhaust strokes of each piston during the complete cycle of the operations of one of the power pistons and indicating the time of opening and closing communication between the combustion chamber of each cylinder and the fuel inlet and exhaust passages of the casing.

Similar characters of reference indicate like parts throughout the several figures.

In its general organization this engine is of the multiple cylinder type and comprises eight cylinders, 20, 21, 22, 23, 24, 25, 26, 27, each of which contains a piston 29 working on the four stroke cycle principle, and these cylinders are arranged to form two groups or blocks A, B, of four cylinders each. The cylinders of each block are arranged around a single valve mechanism, the block A having a valve mechanism C and the block B a valve mechanism D. Each of these valve mechanisms operates to successively admit fuel to the several cylinders of the respective block during the suction strokes of the pistons therein, cut each of the cylinders off from the fuel supply during the compression stroke of the piston therein and also the firing or power stroke thereof, and connect the same with the exhaust for the purpose of discharging the spent gases during the exhaust stroke of the respective pistons. The four cylinders of each set, block or group are arranged in pairs, the members of each pair being arranged in the same plane transversely of the crank shaft and above the same. The cylinders of each pair are arranged at an angle relatively to each other so that they converge downwardly and have their axes on radial lines from the axis of the crank shaft, this angle being preferably 24°, of which 12° is on each side of a vertical plane through the axis of the main crank shaft 30 which is common to all of the engine cylinders. This arrangement permits of imparting the power of the pistons in these cylinders to the crank shaft without undue friction between the pistons and the walls of their cylinders. The two blocks or sets of cylinders are mounted at their lower end on the upper side of the crank casing or base 31 in which is arranged the main or crank shaft 30. The latter is journaled in suitable bearings 28 on this base or casing and provided with four crank pins or wrists 32, 33, 34, 35, each of which is adapted to be coupled with one pair of pistons reciprocating in one pair of cylinders of one of the blocks. The main or crank shaft is provided with counterweights 95, each of which projects therefrom in a direction opposite to one of the crank pins or wrists so as to balance the crank shaft during its rotation. In the preferred construction one of the pistons of each pair is connected by a direct connecting rod 36 with the respective crank of the main shaft, while the companion piston is connected indirectly with the same wrist or crank pin by means of an indirect connecting rod 37 which latter is pivotally connected at its lower end by means of a pivot pin 38 with the lower end of the direct connecting rod adjacent to the respective crank shaft, wrist or pin, as best shown in Figures 2 and 3. By this means a construction is produced which is simpler, more compact and possesses greater durability and accessibility than would be the case if both of these connecting rods were directly connected with the same wrist or crank pin.

Arranged centrally between the four cylinders of each block, set or group, constituting two pairs, is a valve mechanism which comprises an upright cylindrical casing 39 mounted on the adjacent stationary part of this block and having an open upper end which communicates constantly with a fuel inlet or supply passage 40, and an open lower end which is constantly in communication with an exhaust or outlet passage 41, two upper communicating ports 42, 43 connected by communicating passages 44, 45 with the upper ends of the companion cylinders of one pair and two lower communicating ports 46, 47 which are connected by two lower communicating passages 48, 49 with the two companion cylinders of the other pair of this group, as best shown in Figures 2, 6, 7 and 13. The two upper communicating ports of each valve casing are arranged diametrically in line with each other, and the two lower communicating ports are likewise arranged diametrically in line with each other and these several ports are arranged in the same vertical plane relatively to the axis of the valve casing in which they are formed. The charges of fuel admitted to the firing end or combustion chamber of each of these cylinders may be ignited in any suitable manner, for instance by means of jump spark plugs 50 which are secured in the upper parts of the communicating passages leading to these cylinders and which receive an electric current from any suitable source in the usual and approved manner.

Within each of these cylindrical valve casings is arranged a hollow distributing valve of cylindrical form which rotates continuously in the same direction for the purpose of successively placing each of the combustion chambers in communication with the fuel supply during the suction stroke of the piston therein, cutting off this combustion chamber from the fuel supply and the exhaust during the subsequent compression and power strokes of the piston therein and then connecting this combustion chamber with the exhaust of the engine during the discharge stroke of the respective piston so that the engine is operated on the four-cycle principle. At the same time that the valve rotates it is reciprocated lengthwise of the respective valve casing in such manner that this valve always moves in a direction opposite to the piston forces and the masses associated therewith for the purpose of balancing the free moments of the crank shaft, producing less wear on the working parts and reducing vibration of the engine. Each of these distributing valves for this purpose preferably comprises a cylindrical body or wall 51 which fits with its periphery in the bore of the companion cylindrical valve casing 39 and has an open upper end which communicates constantly with the open upper end of the respective valve casing and the fuel supply communicating therewith, and its lower end is also open and communicates constantly with the open lower end of the valve casing and the exhaust passage communicating therewith, while the upper part of this wall is provided on different parts of the same circumferential line with inlet and exhaust ports 52, 53 adapted to register successively with the communicating ports leading to one pair of cylinders, and the lower part of this wall being provided in different parts of the same circumferential line with inlet and outlet ports 54, 55 which are adapted to register successively with the communicating ports leading to the two cylinders of the other pair of the respective block. The fuel inlet ports on the upper and lower parts of the cylindrical wall of this valve are arranged lengthwise out of line or are offset from each other circumferentially on this cylinder and the upper and lower exhaust ports of this valve are similarly offset circumferentially or arranged out of line with each other lengthwise of this valve.

In order to permit of thus utilizing this valve in this manner a partition is provided within the same which separates the interior of this valve into a fuel conduit 96 and an exhaust conduit 97, the fuel conduit being adapted to communicate with the upper and lower fuel inlet ports and the exhaust conduit being adapted to communicate with the upper and lower exhaust ports therein. The upper part or section 56 of this partition extends diametrically across the upper part of the interior of this distributing valve at one angle, and the lower part or section 57 of the same extends diametrically across the lower part of the space within this valve at another angle, the opposing ends of these two partition sections being connected by a horizontal or transverse web 58 and the extremities thereof being connected with the wall of the valve by webs 98 and 99, so that the partition as a whole is of angular form and renders it possible to supply fuel to the several communicating ports of the cylinders, and to exhaust the spent gases from the same in the proper sequence of operation without restricting the flow of fuel and spent gases to become mixed at any time. In order to guard against leakage between the bore of the valve casing and the periphery of the distributing valve and to avoid mixture of live and spent gases, packing means are provided with in their preferred form comprise packing rings 59, 60, 61 mounted circumferentially in suitable grooves in the periphery of the distributing valve body at the upper and lower ends and middle thereof, and longitudinal packing bars 62 arranged lengthwise in suitable longitudinal grooves on the periphery of the valve body between the inlet and exhaust ports thereof.

Although various means may be employed for imparting a continuous rotary and a longitudinal reciprocating motion to each of these valves, the means for this purpose which are shown in the drawings are preferred and constructed as follows:

The numeral 63 represents upright valve shafts or spindles one of which is secured at its lower end to the upper end of each distributing valve. The intermediate part of this valve spindle passes through a driven spiral gear wheel 64 which latter is capable of rotation but held against movement in a direction lengthwise of its axis. This is accomplished by arranging this driven spiral gear wheel in a casing which is provided in its bottom with a circular bearing 65 in which the periphery of the hub 66 of this spiral gear wheel turns, while the web of this gear wheel bears with its underside against the upper end of this bearing and the top of the same bears against the underside of a retaining plate 67 which is detachably secured to the upper part of the side wall 68 of this gear casing, as best shown in Figure 5. The driving connection between the valve spindle and this driven gear wheel is preferably effected by constructing this spindle of longitudinally fluted splined or non-circular form as shown at 69 in Figures 2, 5 and 11 and engaging the same with a correspondingly non-circular or longitudinally fluted bore 70 of the driven gear wheel. Motion for operating the distributing valves may be derived from any suitable part of the engine, but in the present instance this is derived from the main crank shaft and the means which are preferred for this purpose, as shown in the drawings, comprise a horizontal longitudinal valve shaft 71 journaled horizontally in suitable bearings 72 on the upper part of the two engine blocks and provided with two driving spiral gears 73 which mesh respectively with the driven spiral gear wheels of the distributing valves of both blocks, an intermediate shaft 74 journaled in suitable bearings in the front part of the main frame, a lower belt 75 passing around chain pulleys 76, 77 secured respectively to the crank shaft and the intermediate shaft, and an upper chain belt 78 passing around chain pulleys 79, 80 mounted respectively on the intermediate shaft and the valve shaft, as best shown in Figure 1.

The longitudinally reciprocating motion of each distributing valve is preferably effective by means which comprise a circular cam 81 secured to the upper end of each distributing valve spindle and having a cylindrical upper part 82 which turns in a bearing 83 on the adjacent part of the main frame, while its lower part is provided with a circumferential cam groove 84 which receives two thrust rollers 85, 86, engaging with diametrically opposite parts of this cam groove and mounted on the adjacent part of the main frame. This cam groove has its upper and lower walls 87, 88 made of V-shaped form in cross section so that the same converge inwardly, and each of the thrust rollers is preferably constructed in the form of a conical or inwardly tapering roller. One of these rollers engages its conical surface only on its upper side with the upper wall of the conical groove in the cam, while the other roller engages its lower side with the lower wall of the cam groove, as shown in Figure 2, whereby both of these rollers will be free to rotate and thus permit the valve to rotate easily and move lengthwise with a minimum friction and power consumption. As each distributing valve and the companion cam 81 is rotated it is also reciprocated lengthwise of its axis by engagement of the walls of the groove in this cam engaging with the relatively stationary thrust or shifting rollers 85, 86. In order to permit of adjusting these rollers to their respective surfaces on the cam and take up any wear which may occur means are provided for moving these rollers in a direction lengthwise of the axis of the cam and firmly securing the same in its adjusted position. The preferred means for this purpose which are shown in Figures 1, 2 and 4 consist of an adjusting bushing 89 having its periphery journaled in a bearing 90 on the main frame so as to be capable of turning therein and provided with a trunnion 91 which is mounted eccentrically thereon and pivotally supports one of the rollers. It is therefore possible by turning the bushing in its bearing on the main frame to move the respective trunnion in a direction lengthwise of the axis of the cam for causing the respective roller to bear with one side of its conical surface against the respective inclined side of the cam groove and properly engage the same to avoid any looseness between these parts. This turning of the bushing is preferably effected by means of a disk 92 arranged at the outer end thereof, and after this adjustment has been effected the bushing may be held rigidly in place by one or more clamping screws 93, preferably two in number, which pass through slots 94 formed on diametrically opposite sides of the adjusting disk and curved concentrically with the bushing, each of these screws engaging its inner threaded end with the adjacent part of the main frame while its head bears against the outer side of the adjusting disk.

The construction and operation of the valve mechanism is such that in relation to the combustion chamber of each of the cylinders the intake of the respective combustion chamber will be opened shortly after the respective crank of the main shaft associated with the piston of the cylinder has passed a short distance beyond the upper dead center and remains open until this particular crank has made more than one-half of a turn and passed a greater distance beyond the lower dead center, then the combustion chamber is held shut during the subsequent compression stroke of the piston as it moves up to the upper dead center and also during the following power stroke of this piston which preferably begins at the upper dead center of the respective crank and terminates before reaching the lower dead center, and thereafter the exhaust is opened during the following exhaust stroke of the piston which preferably begins a short distance before passing the lower dead center of the respective crank and continues for a short period after passing the upper dead center, ready to begin the next cycle of operations for this particular combustion chamber. This order in which these various steps of the operation of the valve mechanism for each combustion chamber are effected is graphically illustrated in the diagram shown in Figure 19.

The order in which the successive operations in the several cylinders of the engine follow each other may be varied but it has been found in practice that satisfactory results are obtained by the firing order shown in the diagram in Figure 18 which diagram shows that a firing stroke is effected alternately in the two blocks. In the preferred timing of the valve mechanism of these two blocks the intervals of firing are preferably determined as follows during two complete turns of the crank shaft:

Between cylinders No. 1 and 2 66°.
Between cylinders No. 2 and 3 90°.
Between cylinders No. 3 and 4 114°.
Between cylinders No. 4 and 5 66°.
Between cylinders No. 5 and 6 114°.
Between cylinders No. 6 and 7 90°.
Between cylinders No. 7 and 8 66°.
Between cylinders No. 8 and 1 114°.

It follows from this order and timing of firing that the crank shaft is constantly under the effect of a power stroke from one or another of the several pistons while explosions of fuel therein occur so that the engine is constantly developing power and no back-lash in the crank shaft exists in any part of its rotation. Furthermore the length of the intervals between successive firing of the charges of fuel in the several cylinders is irregular, thus avoiding any tendency of the engine to pulsate and develop strains which would be liable to occur if the firing order followed in regular sequence or intervals of the same length.

In the present engine no parts are used to balance the free moments of the crank shaft and other moving masses excepting the reciprocating motion of the valves, thereby materially simplifying the engine so far as the number of parts is concerned, whereby the wear on the same is reduced and it is possible to make the engine comparatively light for a certain development of horsepower.

In the operation of the engine each distributing valve makes one-half of a complete rotation for each turn of the crank shaft and during such rotation, for example the valve C, the same in one position has its upper fuel port 52 registering with the cylinder 20, as shown at the left of Figure 6, and at the same time the lower exhaust port 55 of this valve registers with the cylinder 23, as shown at the left in Figure 7, during which time the piston in the cylinder 20 is effecting a suction stroke and the piston in the cylinder 23 is effecting an exhaust stroke. As the valve C continues to turn in the same direction the fuel supply to the cylinder 20 is cut off, as shown in Figure 8, and the same is kept shut during the subsequent compression and power strokes of the respective piston, and the upper exhaust port 53 of this valve is opened to the communicating port of the companion cylinder 21 to permit the spent gases to escape therefrom during the exhaust stroke of the respective piston which occurs at this time. A continued rotation of the valve C in the same direction causes its upper solid part to continue the closure of the cylinder 20 while the piston therein is effecting its working stroke and at the same time its upper fuel port 52 is brought into register with the communicating passage of the cylinder 21, as shown in Figure 9, so that fuel is supplied to the latter during the suction stroke of the piston therein. Further rotation of this valve causes its upper fuel inlet port to be moved out of register with the communicating passage of the cylinder but brings its upper exhaust port into register with the communicating passage 44 of the cylinder, as shown in Figure 10, to permit the spent gases to exhaust therefrom during the discharge stroke of its piston. This valve now completes its cycle of operations by turning to the position shown in Figure 6 where fresh fuel is again admitted to the upper port 52 into the cylinder during the suction stroke of the piston therein preparatory to beginning the next cycle of operations. In like manner the lower fuel and exhaust ports 54, 55 of the valve are brought successively into register with the communicating passages of the pair of cylinders 22, 23 for controlling the supply of fuel thereto and the discharge of spent gases therefrom in the proper order to suit the suction, compression, working and exhausting strokes of the respective pistons in these cylinders.

The crank pins or wrists of the main shaft with which the two pairs of pistons of each block of four connect, respectively, are 180 degrees apart, and the plane of the two crank pins or wrists of one set of four piston connecting rods is at right angles to the plane of the two crank pins or wrists of the other set of four piston connecting rods, as shown in Figure 16, and the timing of the distributing valves is such that the firing of several cylinders occurs in succession and alternates between the sets of cylinders so as to produce a practically uniform action and continuous power application on the crank shaft during all parts of each rotation.

This organization of an internal combustion engine renders it possible to use less moving parts for accomplishing the same result as compared with an engine of this character employing poppet valves and it also frees the motor from undesirable vibration common to multi-cylinder internal combustion engines heretofore used for light duty high speed work, such as automobiles, air craft, motor boards, etc.

By so timing the valve operating cams that the resultant force of their collective longitudinal movement is in the general direction opposite to the resultant force of the several pistons, this produces an effective balancing of the free moments of the crank shaft and causes the engine to run smoothly and with a minimum of vibration. This result is aided by arranging the four cylinders of each set or block substantially equidistant around their respective distributing valve and arranging the cylinders thereof in two pairs, the members of each of which are arranged in the same vertical transverse plane and have their pistons connected with the same crank pin or wrist, and arranging the two cranks of one block 180 degrees apart and the cranks of one block on a plane which is 90 degrees apart from the plane of the cranks of the other block.

Each of the distributing valves being open at both ends and divided by a web or partition forming an incoming fresh gas chamber and an outgoing spent gas chamber, each of which has upper and lower ports, a duplex steepled or double decked valve is produced, one section of which controls the entrance and exit of gases of one pair of cylinders and the other the entrance and exit of gases of the other pair of cylinders, whereby, due to harmonizing the timing of these valves with the positions of the crank pins or wrists, a more uniform distribution of the heat from the exhaust of the several cylinders is effected and the chances of warping the valves is lessened.

By connecting one connecting rod or pitman of a pair of pistons directly with a crank pin or wrist on the main shaft and articulating the other connecting rod on the first mentioned one so that an indirect connection between the same and this crank pin or wrist is obtained it is possible to obtain a more effective bearing surface of these two connecting rods on the respective pin or wrist and couple the respective connecting rods therewith without making the coupling elements unduly small.

The ports in the lower half of each distributing valve function the same as the ports in the upper half of the same except that the same are 90 degrees apart. This permits of the present advantageous design of crank shaft which eliminates the dislocation of the center of gravity of the piston masses common to the conventional eight cylinder V-type engine heretofore used.

The cams being of harmonic form and the rollers arranged on diametrically opposite sides of each cam and engaging with the upper and lower sides of the grooves thereof, operates to raise and lower the distributing valves and still eliminate the possibility of any back-lash and permit these rollers to turn continuously in one direction. The reciprocating motion of the several parts is so timed and the frequencies so determined to perfect the moments set up by the pistons, connecting rods, pins or wrists of the crank shaft, and the distances of the several movable parts from the center of the motor mass.

I claim as my invention:

1. An internal combustion engine comprising a main shaft having a plurality of crank pins or wrists, a plurality of pairs of power cylinders, the members of each pair being arranged in a plane transversely of the axis of said shaft, pistons reciprocable in said cylinders and the pistons in each pair of cylinders being operatively connected with one of the crank pins or wrists of said main shaft, and means for supplying fuel to and exhausting the spent products therefrom comprising a valve casing communicating at its opposite ends with a fuel supply and an exhaust and provided on diametrically opposite sides of one part of its length with communicating ports leading to one pair of said cylinders and on diametrically opposite sides of another part of its length with communicating ports leading to another pair of said cylinders, and a hollow valve rotatable in said valve casing and opening at its opposite ends to said fuel supply and exhaust passage and in one part of its length with circumferentially spaced fuel and exhaust ports adapted to register successively with the communicating ports of one pair of cylinders, and in another part of its length with circumferentially spaced fuel and exhaust ports adapted to register successively with the communicating ports of the other pair of cylinders, and said valve being provided with a partition which separates said fuel and exhaust ports.

2. An internal combustion engine comprising a crank shaft, a power cylinder, a piston reciprocable in said cylinder and operatively connected with said crank shaft, and a valve mechanism for controlling the fuel supply to and the exhaust from said cylinder comprising a valve casing having a fuel inlet, an exhaust outlet and a communicating port leading to said cylinder, a valve rotatable and reciprocable in said cylinder and having fuel and exhaust ports adapted to register successively with said communicating port, means for rotating said valve, and means for reciprocating said valve comprising a cam rotating with said valve and provided with an annular cam groove, and thrust members mounted on a normally stationary support on diametrically opposite sides of said cam and one engaging one wall of said groove and the other engaging the opposite wall of the same.

3. An internal combustion engine comprising a crank shaft, a power cylinder, a piston reciprocable in said cylinder and operatively connected with said crank shaft, and a valve mechanism for controlling the fuel supply to and the exhaust from said cylinder comprising a valve casing having a fuel inlet, an exhaust outlet and a communicating port leading to said cylinder, a valve rotatable and reciprocable in said cylinder and having fuel and exhaust ports adapted to register successively with said communicating port, means for rotating said valve, and means for reciprocating said valve comprising a cam rotating with said valve and provided with an annular cam groove, thrust members mounted on a normally stationary support on diametrically opposite sides of said cam and one engaging one wall of said groove and the other engaging the opposite wall of the same, and means for adjusting said thrust members in a direction lengthwise of the axis of the cam.

4. An internal combustion engine comprising a crank shaft, a power cylinder, a piston reciprocable in said cylinder and operatively connected with said crank shaft, and a valve mechanism for controlling the fuel supply to and the exhaust from said cylinder comprising a valve casing having a fuel inlet, an exhaust outlet and a communicating port leading to said cylinder, a valve rotatable and reciprocable in said cylinder and having fuel and exhaust ports adapted to register successively with said communicating port, means for rotating said valve, and means for reciprocating said valve comprising a cam rotating with said valve and provided with an annular cam groove which is V-shaped in cross section, conical thrust rollers mounted on a normally stationary support and engaging with said groove on diametrically opposite sides of said cam, and means for adjusting said rollers bodily in a direction parallel with the axis of said cam.

5. An internal combustion engine comprising a crank shaft, a power cylinder, a piston reciprocable in said cylinder and operatively connected with said crank shaft, and a valve mechanism for controlling the fuel supply to and the exhaust from said cylinder comprising a valve casing having a fuel inlet, an exhaust outlet and a communicating port leading to said cylinder, a valve rotatable and reciprocable in said cylinder and having fuel and exhaust ports adapted to register successively with said communicating port, means for rotating said valve, and means for reciprocating said valve comprising a cam rotating with said valve and provided with an annular cam groove which is V-shaped in cross section, conical thrust rollers mounted on a normally stationary support and engaging with said groove on diametrically opposite sides of said cam, and means for adjusting said rollers bodily in a direction parallel with the axis of said cam comprising bushings journaled on said support and turning about an axis at right angles to the axis of said cam, trunnions mounted eccentrically on said bushings and each pivotally supporting one of said rollers, and means for rotatably adjusting each of said bushings.

6. An internal combustion engine comprising a crank shaft, a power cylinder, a piston reciprocable in said cylinder and operatively connected with said crank shaft, and a valve mechanism for controlling the fuel supply to and the exhaust from said cylinder comprising a valve casing having a fuel inlet, an exhaust outlet and a communicating port leading to said cylinder, a valve rotatable and reciprocable in said cylinder and having fuel and exhaust ports adapted to register successively with said communicating port, means for rotating said valve, and means for reciprocating said valve comprising a cam rotating with said valve and provided with an annular cam groove which is V-shaped in cross section, conical thrust rollers mounted on a normally stationary support and engaging with said groove on diametrically opposite sides of said cam, and means for adjusting said rollers bodily in a direction parallel with the axis of said cam comprising bushings journaled on said support and turning about an axis at right angles to the axis of said cam, trunnions mounted eccentrically on said bushings and each pivotally supporting one of said rollers, an adjusting disk arranged on the outer end of each bushing and provided with a slot concentric with said bushing and a clamping bolt passing through said slot and connected with said support.

In testimony whereof I affix my signature.

EDWIN LOZIER THOMAS.